US008848920B2

(12) United States Patent
Wingert (10) Patent No.: US 8,848,920 B2
(45) Date of Patent: Sep. 30, 2014

(54) METHOD AND APPARATUS FOR DELIVERING KEYS

(75) Inventor: Christopher R. Wingert, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1222 days.

(21) Appl. No.: 11/182,087

(22) Filed: Jul. 14, 2005

(65) Prior Publication Data

US 2006/0013401 A1  Jan. 19, 2006

Related U.S. Application Data

(60) Provisional application No. 60/588,203, filed on Jul. 14, 2004.

(51) Int. Cl.
*H04L 29/06* (2006.01)
*H04W 12/04* (2009.01)
*H04L 9/08* (2006.01)

(52) U.S. Cl.
CPC .............. *H04L 63/068* (2013.01); *H04L 9/08* (2013.01); *H04L 9/0816* (2013.01); *H04L 9/0819* (2013.01); *H04L 63/0428* (2013.01); *H04L 63/062* (2013.01); *H04L 63/083* (2013.01); *H04L 63/10* (2013.01); *H04L 2463/101* (2013.01); *H04W 12/04* (2013.01)
USPC ........................................................ 380/278

(58) Field of Classification Search
CPC ....... H04L 9/08; H04L 9/0816; H04L 9/0819; H04L 63/06; H04L 63/068
USPC .................................. 726/27, 28, 29; 380/278
See application file for complete search history.

(56) References Cited

U.S. PATENT DOCUMENTS

| 6,505,052 | B1 | 1/2003 | Jou et al. | |
| 6,636,968 | B1 * | 10/2003 | Rosner et al. | 713/178 |
| 6,751,731 | B1 * | 6/2004 | Binding et al. | 713/171 |
| 2001/0037403 | A1 * | 11/2001 | Mougi et al. | 709/238 |

(Continued)

FOREIGN PATENT DOCUMENTS

| EP | 1152566 A2 | 3/2001 |
| EP | 1152566 A2 | 11/2001 |

(Continued)

OTHER PUBLICATIONS

International Search Report—PCT/US05/025151, International Search Authority—European Patent Office—Oct. 21, 2005.

(Continued)

*Primary Examiner* — Michael S McNally
(74) *Attorney, Agent, or Firm* — Arent Fox LLP (57) ABSTRACT

The present invention encompasses an electronic device, such as a server, which may be operated in a communication system. The electronic device comprises a method for receiving a request from another electronic device to transmit keys, for example a mobile terminal. Responsive to the request, the server generates the required keys and determines a best time to send the keys to the mobile client device such that a new connection is not required just for sending the requested keys. The best time to send the keys may be during a scheduled connection for sending non-key data, for example a connection setup for transmitting system parameters, content data, etc. By sending the keys along with the non-key data, a need for a special connection is avoided.

40 Claims, 4 Drawing Sheets

(56) References Cited

U.S. PATENT DOCUMENTS

| | | | |
|---|---|---|---|
| 2002/0180782 A1 | 12/2002 | Natsuno | |
| 2003/0007466 A1 | 1/2003 | Chen | |
| 2003/0100176 A1 | 5/2003 | Kim et al. | |
| 2003/0131257 A1* | 7/2003 | Frantz et al. | 713/201 |
| 2003/0200176 A1* | 10/2003 | Foster et al. | 705/51 |
| 2004/0010717 A1* | 1/2004 | Simec et al. | 713/201 |
| 2004/0123312 A1 | 6/2004 | Kimura | |
| 2004/0162870 A1* | 8/2004 | Matsuzaki et al. | 709/200 |
| 2005/0268346 A1* | 12/2005 | Lee et al. | 726/27 |
| 2006/0090207 A1 | 4/2006 | Tomita et al. | |

FOREIGN PATENT DOCUMENTS

| | | |
|---|---|---|
| JP | 63237633 A | 10/1988 |
| JP | 08331091 | 12/1996 |
| JP | 2002518935 A | 6/2002 |
| JP | 2002217894 A | 8/2002 |
| JP | 2003523663 A | 8/2003 |
| JP | 2003524330 A | 8/2003 |
| JP | 2003283521 | 10/2003 |
| JP | 2004032711 A | 1/2004 |
| JP | 2004048676 A | 2/2004 |
| JP | 2004133801 A | 4/2004 |
| JP | 2004172816 A | 6/2004 |
| RU | 2178913 | 1/2002 |
| WO | WO9966670 A1 | 12/1999 |
| WO | 0158162 | 8/2001 |
| WO | 0158179 A2 | 8/2001 |
| WO | 03051072 | 6/2003 |

OTHER PUBLICATIONS

Written Opinion—PCT/US05/025151, International Search Authority—European Patent Office—Oct. 21, 2005.
European Search Report—EP10175272—Search Authority—Munich—Oct. 13, 2010.
Daza, Vanesa, et al; "A Distributed and Computationally Secure Key Distribution Scheme", Information Security, Lecture Notes in Computer Science, vol. 2433, 2002, pp. 342-356; (2002) 2. Japanese laid-open patent Publication No. 2004-048676.
Translation of Office Action in Japanese application 2007-521672 corresponding to U.S. Appl. No. 11/182,087, dated Feb. 1, 2011.
Translation of Office Action in Japanese application 2007-521672 corresponding to U.S. Appl. No. 11/182,087, citing JP200448676 and JP63237633 dated Feb. 1, 2011.

* cited by examiner

METHOD AND APPARATUS FOR DELIVERING KEYS

CLAIM OF PRIORITY UNDER 35 U.S.C. §119

The present Application for Patent claims priority to Provisional Application No. 60/588,203 entitled "A Method And Apparatus For Delivering Keys" filed Jul. 14, 2004, and assigned to the assignee hereof and hereby expressly incorporated by reference herein.

FIELD OF THE INVENTION

This invention relates to the field of content delivery system, and in particular to the delivery and reception of keys between a server and one or more client terminals.

BACKGROUND OF THE INVENTION

In a content delivery system, operating in a wireless communication that utilizes a portable client and fixed server for delivery of audio and video content, protection and management of digital rights are a concern. Various methods are employed to efficiently deliver content such that digital rights of the content owner are protected. One conventional way to manage and protect the digital rights is to encrypt the content at the server using one or more keys (encryption or decryption) and providing the keys to an authorized user, using a client device, who subscribes to the content. Thus, the users with keys may decrypt the content to view and/or listen to subscribed content.

Generally, content is encrypted using keys (one or more bits) and the keys are delivered on a regular basis. The keys that decrypt the content are delivered periodically. In order to provide the content and keys that decrypt the content at client devices, various over the air techniques are used. Often, a key-exchange method is employed to provide a set of keys (for example public keys and private keys) between the server and the client.

A common method is for the client to request a new key(s) or server sending new key(s) to the client. According to this method, a new connection is made between client and server in order to transmit the keys to client. Depending on time of day, there could be several client devices on the system, each requesting a new set of keys. Responsive to the key requests, a new connection must be opened to exchange the keys. Most systems today require that new keys be used each time a new content is provided to the user, since using new keys provide a greater security. Also, each time one or more keys expire or each time a subscription is renewed, a new connection is created to update old or expired keys. This is a burden on system, considering that there are thousands of devices that may request access to new content or renew subscription. Opening and closing a connection ties up resources for the server, especially during peak hours. It would be useful to exchange keys without having to create a new connection and get the necessary keys to the client.

Therefore, an efficient delivery system is needed to deliver keys without placing an extra burden on the content delivery system.

SUMMARY OF THE INVENTION

An embodiment of invention provides an apparatus and an associated method, for an electronic device, that manages delivery of one or more keys to another electronic device without creating unnecessary connections between the server and the mobile terminal.

The exemplary electronic device, such as a server, may be operated in a communication system (for example CDMA, TDMA, GSM, OFMD, OFDMA etc.). The electronic device comprises a method for receiving a request from another electronic device to transmit keys, for example a mobile terminal. Responsive to the request, the server generates the required keys and determines a best time to send the keys to the mobile client device such that a new connection is not required just for sending the requested keys. The best time to send the keys may be during a scheduled connection for sending non-key data, for example a connection setup for transmitting system parameters, content data, etc. By sending the keys along with the non-key data, a need for a special connection is avoided.

The embodiment also encompasses an electronic device, such as mobile terminal, which may be operated in a communication system (for example CDMA, TDMA, GSM, OFDM, OFDMA etc.). The mobile terminal comprises a method for requesting one or more keys from a server and receiving the requested keys during a connection setup by the server for transmitting non-key data. By receiving the keys along with non-key data, need for a special connection is avoided.

The embodiment also encompasses an electronic device, such as mobile device, a server computer, portable computer, etc. operable in a communication system. The server computer comprises a method for receiving a request for one or more keys from an external electronic device and transmitting the requested keys during a connection setup for transmitting non-key data. By transmitting the keys along with non-key data, a need for a special connection is avoided.

A more complete appreciation of all the embodiments and scope can be obtained from the accompanying drawings, the following detailed description of the invention, and the appended claims.

DETAILED DESCRIPTION OF THE INVENTION

Figure 1:
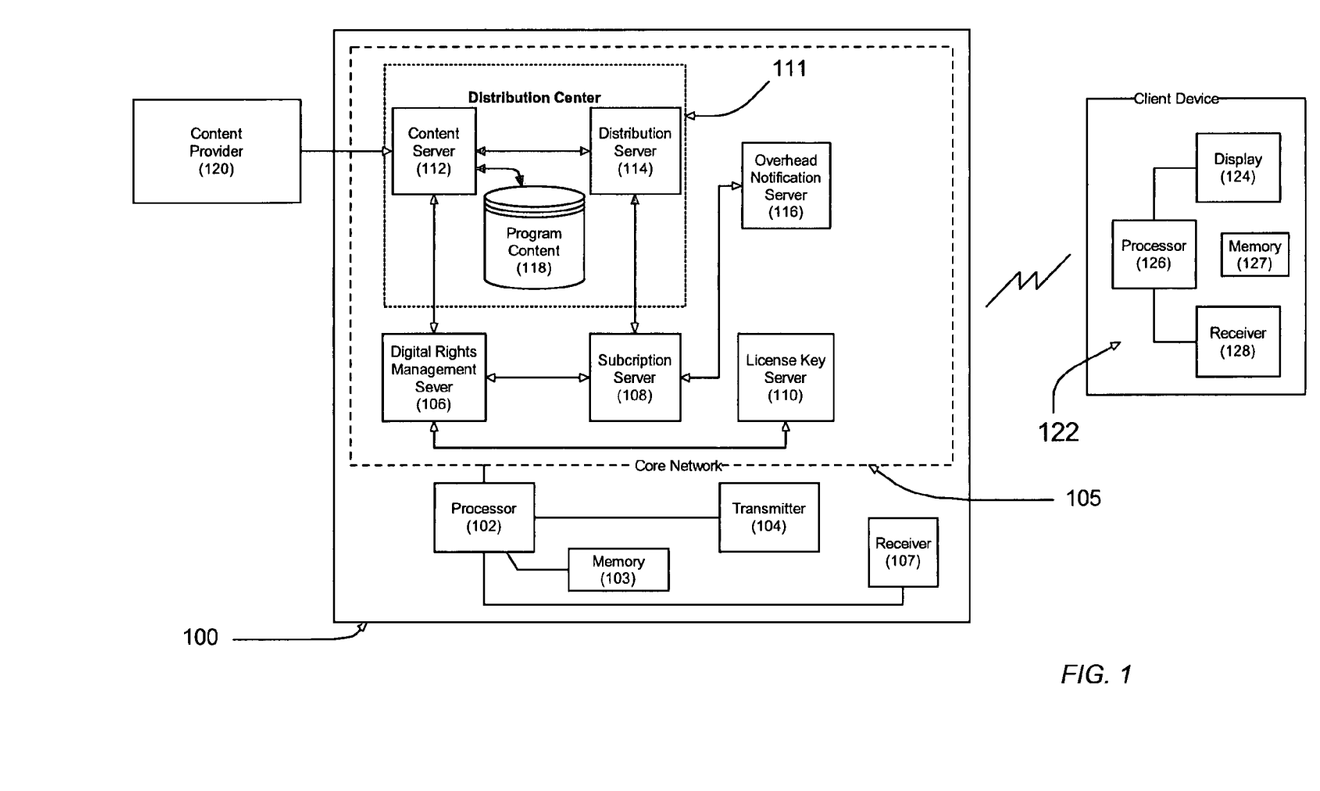
FIG. 1 illustrates a block diagram of electronic devices operating in wireless content delivery system according to an embodiment of the invention.

FIG. 1 illustrates a communication system and block diagram of electronic devices operating within the system, such as a server device 100, mobile client terminal 122 ("Client") and content provider 120. The server device 100 comprises a controller (which may also be known as processor 102 and may control the operations of the server device 100) coupled to memory 103 and various servers (collectively known as core network 105). Each of the various servers may comprise a processor, receiver, transmitter and various memories and may also be coupled to processor 102, memory 103, transmitter 104 and receiver 107. Generally, the server device 100 receives content from the content provider 120 and the server device communicates with one or more mobile client terminals 122. The server device 100 may be a stand alone computer or a plurality of computers connected each other to form server device 100. The server device 100 may also be a mobile terminal wirelessly connected to the one or more computers and one or more mobile client terminal 122.

The core network 105 includes a distribution center 111 comprising a content server 112 which receives content for the system directly from the content provider 120, a distribution server 114 distributes the content to one or more mobile client devices, and a program content database 118 stores content received from the content provider 120. The core network may comprises a digital rights management server (DRM) 106 that generates one or more keys (for example general keys for decryption, program keys, session keys, encrypted program keys, service keys and service licenses) and manages the secure storage of those keys. Subscription server 108 performs subscription management for the system and communicates to mobile client device. A License Key server (LKS) 110 services key requests from the subscribed mobile client terminals 122, and an Overhead Notification server (ONS) 116 is responsible for collecting notifications of state changes which are timely transmitted to the mobile client terminal 122. The transmitter 104 and the receiver 107 are coupled to the processor 102. It should be noted that transmitter 104 and receiver 107 may be connected wirelessly or by hard wire to external devices for transmitting and receiving information, respectively.

The example of mobile client terminal 122 comprises a controller (which may also be referenced to as processor 126) coupled to memory 127. The mobile client terminal 122 communicates with the server device 100 to receive content and keys to decrypt the content.

Figure 2A:
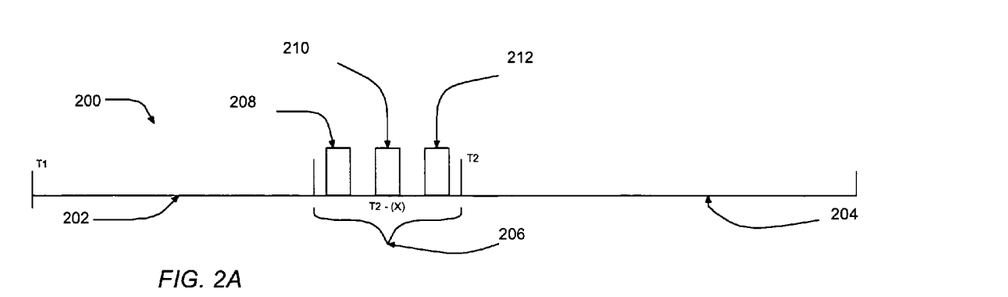
FIG. 2A illustrates an example of operation of content delivery system using key epochs.
Figure 2B:
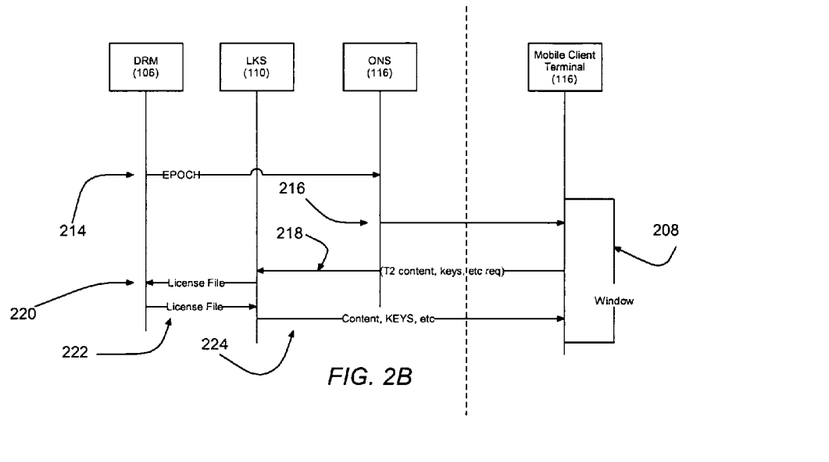
FIG. 2B illustrates an example of operation of content delivery system during a key epoch.

FIGS. 2A and 2B illustrates an example of operation of content delivery system using key epochs 200 and various messages that are sent between the sever device 100 and the mobile device 122. An epoch is a unique period of time wherein a specific key is valid. Generally, a time period, for example a 24-hour period, is divided in to one or more key epochs. The length of the each key epoch that may be predetermined by the system provider or dynamically configurable. FIG. 2A shows an example of key epoch T1 202 and key epoch T2 204, and an example of operation of the content delivery system during the epochs. In a typical content delivery system, the server device 100 is not always connected to the mobile client terminal 122. Based on the service provider, the server device 100 only periodically communicates with one or more mobile client terminals to reduce congestion in the system. Service providers generally do not have enough bandwidth to communicate with all the mobile client terminals on an "Always-On" basis. Therefore, most service providers schedule a time to open a connection, for example a connection window for sending and receiving data between mobile client terminal 122 and server device 100.

As shown in FIG. 2A, key epoch T1 202 further comprises a delta portion 206, which is T2-X, wherein X represents a time change (delta) before the start of T2 204 epoch. Preferably, during this time, the system attempts to create a connection between the server device 100 and one or more of mobile client terminal 122 in the system. The connection (also known as a communication link) is made during one or more scheduled windows, for example 208, 210 and 212. The communication link may be made using various known wireless communication techniques, for example CDMA 1X-EVDO system or Orthogonal Frequency Divisional Multiple Access (OFDMA) system, that allow transmission and reception of multi-media data. The operators of the system may decide the value of X, which will affect the size of the delta 206 and number of windows that can be created during this time. Also, depending on the operator and the type of information that is need to be communicated, a window of time may communicated with one mobile client terminal 122 or several mobile client terminals at the same time. Therefore, several hundred windows may be used to ensure that necessary or requested information is sent to the mobile client terminals.

As shown in FIG. 2B, prior to the start of a scheduled window, for example 208, an epoch event 214 is created. Thereafter, a communication link between the server device 100 and the mobile client terminal 122 is created. Information for the start of the window period and setting up the communication link is sent to the mobile client terminal 122. Message 216 is used to communicate information, such as system parameters that set up the communication link. The sever device 100 schedules a time when message 216 is sent to the mobile client device 122. Typically, message 216 contains only non-key data; however, it is contemplated that message 216 may also contain key data. Non-key data is any data other than encryption or decryption keys (example portion of decryption key, program key, session key, etc). For example, non-key data may be data representing content, program application, or executable code. The non-key data may also comprise set of system parameters comprising a data rate information of the communication link, server device states, status of keys and program content. Responsive to receiving message 216, the mobile client terminal 122 may send a message 218 to request for new content or/and keys for future use. If the mobile client terminal 122 has requested new keys, then the server device 100 will generate new keys by communicating with the digital rights management (DMR) server device 100 using 220 and 222 messages. Thereafter, message 224 is generated and transmitted to mobile client device 122. Generally, message 224 is a scheduled for transmitting non-key data only, unless the requested keys are ready to be transmitted during this window.

According to an embodiment, the server device 100 may take advantage of the transmission of the messages 216 or 224 to send one or more keys. Generally, message 216 and 214 are not intended to send any keys, only system parameters. If the server device 100 has any keys to transmit to the mobile client terminal 122, then the server device 100 may attach the keys during these transmissions to avoid having to create a new connection for transmitting the keys. Also, if determined through message 218 that the mobile client terminal 122 needs new keys then the server device 100 may take advantage of sending keys along with non-key data message 224 to transmit keys to the mobile client terminal 122, without creating a special connection.

Figure 3:
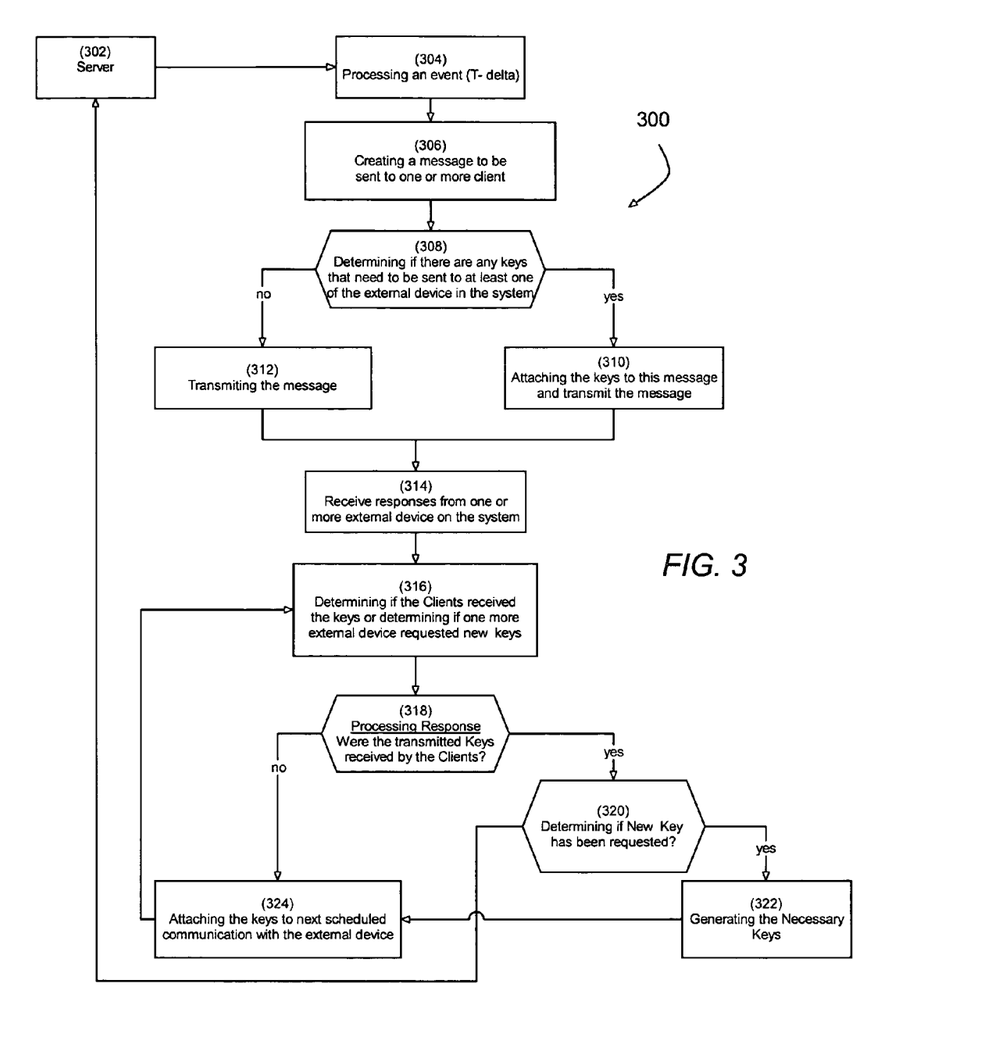
FIG. 3 illustrates an example of flowchart of tasks performed by processor of the server device according to an embodiment the invention.

FIG. 3 illustrates an example of flowchart 300 of tasks of delivering keys is performed by processor 102 of the server device's 100 according an embodiment the invention. At block 302, data is continually being prepared for transmission. At block 304, the processor processing a scheduled event to send a message to the external device. At block 306, the processor creating a non-key data message to be sent to one or more mobile client terminals; typically this message only contains system parameters to create a connection. At block 308, the processor determining if there are any keys that need to be sent to at least one or more mobile client terminals in the system. If yes, then at block 310, the processor attaching the keys to this message, a scheduled non-key data message, and transmits the message. Otherwise, at block 312, transmitting the non-key data message without any keys. Responsive to the transmitted message of block 310 or 312, at block 314 the processor receiving a response from the mobile client terminal 122. Generally, this response establishes a connection between the server device 100 and mobile client terminal 122. At block 316, the processor determining if the mobile client terminal received the keys sent at block 310, or determining if the mobile client terminal is requesting new keys. At block 318, the processor processing the response received from the mobile client terminal 122 to determine if the transmitted keys were received by the mobile client terminal 122. If yes, then at block 320, processor determining if the mobile client terminal 122 has requested new keys. If yes, then at block 322, the processor generating the necessary keys and at block 324, attaching the keys to the next scheduled message communicated to the mobile client terminal 122. Otherwise, processor returns to block 302. If determined that at block 318 that the keys were not received, then at block 324, attaching the keys to the next scheduled message communicated to the mobile client terminal 122.

Figure 4:
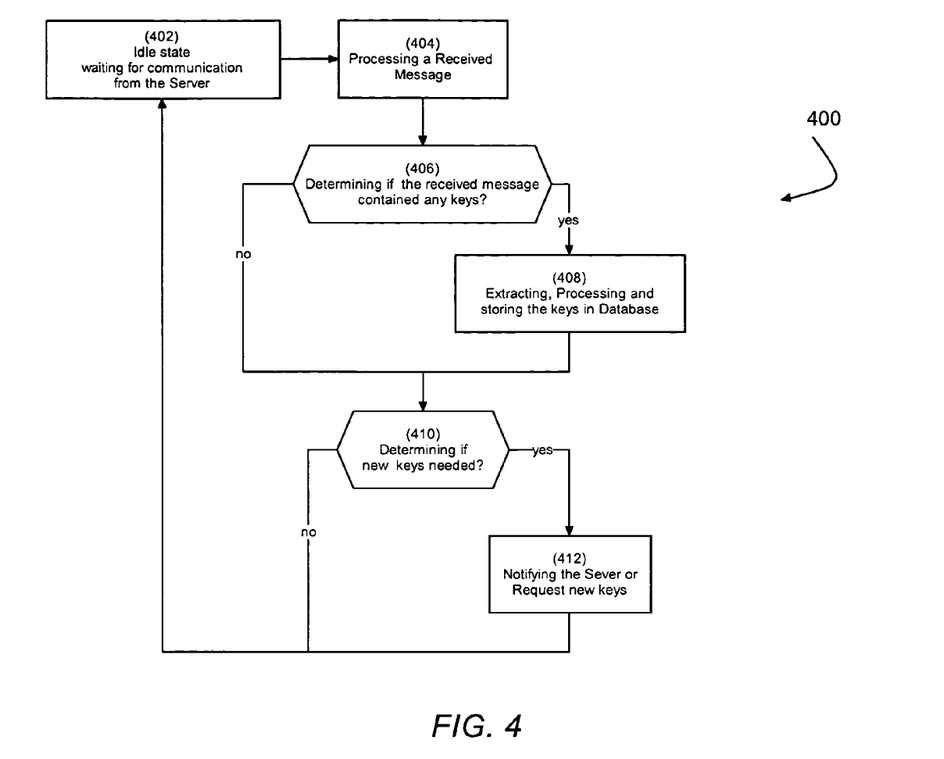
FIG. 4 illustrates an example of flowchart of tasks performed by processor of the mobile client device according to an embodiment the invention.

FIG. 4 illustrates an example of flowchart 400 of tasks performed by the mobile client terminal's 122 processor 126 for receiving keys according to an embodiment of the invention. At block 402, the mobile client terminal 122 is an idle state of the content delivery system wherein, the server device 100 and the mobile client terminal 102 may have a communication link or may have communication link without data connection. The mobile client terminal 122 is waiting for communication from the server device 100. At block 404, the processor processing a received message, generally from the server device 100. This message may or may not contain any keys. At block 406, the processor determining if the received message contained any keys. If yes, then at block 408, the processor 126 extracting one or more keys, processing the extracted keys and then storing the keys in a database. Thereafter at block 408, receiving one or more keys during a connection scheduled for receiving non-key data. At block 410, the processor 126 determining if the mobile client terminal 122 will need new keys. If so, then at block 412, the processor 126 will notifying the server device 100 or requests the new keys. Thereafter, the processor waits at block 402 for another message from the server device 100 to extract the keys.

As examples, the method and apparatus may also be implemented in mobile electronic devices such as a mobile telephone, PDA, mobile computers, mobile server computer and other devices having a wireless connection system and receiving audio and video data. Also, as example, the content may by block of video and audio data such as full television program or segment of one or more program.

While the invention has been particularly shown and described with reference to a preferred embodiment, it will be understood by those skilled in the art that various changes in form and details may be made therein without departing from the scope of the invention as defined by the appended claims. That is, other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of receiving one or more keys, the method comprising acts of:

scheduling at a core network, a time to open a scheduled connection with a client device for transmitting non-key data to the client device;

determining in the client device whether to request said one or more keys for decrypting content previously stored in the client device;

requesting delivery of said one or more keys from the core network; and receiving in the client device said one or more keys attached to a non-key data message from the core network during the scheduled connection for transmitting the non-key data.

2. The method as claimed in claim 1, wherein the determining comprises receiving a notification based on a first criteria.

3. The method as claimed in claim 2, wherein said first criteria comprises evaluating if at least one or more previously received keys will be expiring.

4. The method as claimed in claim 2, wherein said first criteria comprises determining if said one or more keys were not received.

5. The method as claimed in claim 1, wherein the receiving in the client device said non-key data comprises receiving a set of system parameters.

6. The method as claimed in claim 1, wherein the receiving in the client device said non-key data comprises receiving a set of multi-media data.

7. The method as claimed in claim 1, wherein the receiving in the client device said non-key data comprises receiving a set of system parameters and a set of multimedia data.

8. The method as claimed in claim 1, further comprising storing said received one or more keys into a database on the client device.

9. The method as claimed in claim 1, wherein said core network comprises a digital rights management server and a license key server.

10. An apparatus, operable in a mobile communication system that has a scheduled time to open a scheduled connection with the apparatus for transmitting non-key data to the apparatus during the scheduled connection and wherein the apparatus is configured to receive one or more keys, the apparatus comprising:

a processor configured to determine if said one or more keys needs to be requested for decrypting content previously stored in the apparatus and to request delivery of said one or more keys; and said processor further configured to receive said one or more keys attached to a non-key data message during the scheduled connection for transmitting the non-key data.

11. The apparatus as claimed in claim 10, wherein said processor is further configured to receive a notification based on a first criteria.

12. The apparatus as claimed in claim 11, wherein said first criteria comprises a value of a key expiration.

13. The apparatus as claimed in claim 11, wherein said first criteria comprises a value generated after the determining if the one or more keys were not received.

14. The apparatus as claimed in claim 10, wherein said non-key data comprises a set of multi-media data.

15. The apparatus as claimed in claim 10, wherein said non-key data comprises a set of system parameters.

16. The apparatus as claimed in claim 10, wherein said non-key data comprises a set of system parameters and a set of multi-media data.

17. The apparatus as claimed in claim 10, wherein said processor is further configured to store said received one or more keys into a database.

18. The apparatus as claimed in claim 10, wherein said processor is further configured to receive said one or more keys, and wherein said at least one of said one or more keys comprises a license key.

19. An apparatus for delivering one or more keys, operable in a wireless communication system, the apparatus comprising:
a processor configured to:
schedule a time to open a scheduled connection with a mobile device for transmitting non-key data to the mobile device;
receive a request from said mobile device to transmit one or more keys for decrypting content previously stored in the mobile device;
generate said one or more keys to be sent to the mobile device;
attach said one or more keys to a non-key data message; and
transmit said non-key data message with said attached generated one or more keys to said mobile device during the scheduled connection for transmitting the non-key data.

20. The apparatus as claimed in claim 19, wherein said processor is further configured to send a notification to said mobile device indicating that the one or more keys are available for transmission.

21. The apparatus as claimed in claim 19, wherein said processor is further configured to access a license key server to generate said one or more keys.

22. The apparatus as claimed in claim 19, wherein said processor is further configured to access a license key server, a digital rights management server and a distribution center to generate said one or more keys.

23. The apparatus as claimed in claim 19, wherein said processor is further configured to determine a schedule for said connection.

24. The apparatus as claimed in claim 19, wherein said processor is further configured to determine if said one or more keys have expired before generating said one or more keys.

25. The apparatus as claimed in claim 19, wherein said non-key data message contains system parameters.

26. The apparatus as claimed in claim 19, wherein said processor is further configured to use key epochs to schedule said connection for transmitting the non-key data.

27. A method of delivering one or more keys in a wireless communication system, the method comprising:
scheduling a time to open a scheduled connection with a mobile device for transmitting non-key data to the mobile device;
receiving a request to transmit one or more keys from the mobile device for decrypting content previously stored in the mobile device;
generating said one or more keys to be sent to the mobile device;
attaching said one or more keys to a non-key data message; and
transmitting said one or more keys to the mobile device during the scheduled connection for transmitting the non-key data.

28. The method as claimed in claim 27, further comprising sending a notification indicating that the one or more keys are available for transmission.

29. The method as claimed in claim 27, wherein the generating comprises accessing a license key server.

30. The method as claimed in claim 27, wherein the generating comprises accessing a license key server, a digital rights management server and a distribution center.

31. The method as claimed in claim 27, further comprising determining a schedule for said connection.

32. The method as claimed in claim 27, further comprising determining if said one or more keys have expired before generating said one or more keys.

33. The method as claimed in claim 27, wherein said non-key data message contains system parameters.

34. The method as claimed in claim 27, further comprising using key epochs to schedule said connection for transmitting the non-key data.

35. A method of delivering one or more keys from a first device to a second device, the method comprising:
scheduling, at the first device, a time to open a scheduled connection with the second device for transmitting non-key data to the second device;
determining, at the second device, if the one or more keys need to be requested for decrypting content previously stored in the second device;
requesting the first device to deliver said one or more keys;
generating said one or more keys, at the first device, to be sent to the second device;
attaching said one or more keys to a non-key data message;
transmitting said one or more keys and said non-key data message from the first device to the second device during the scheduled connection for transmitting the non-key data; and
receiving, at the second device, said one or more keys from the first device during the scheduled connection for transmitting the non-key data.

36. The method as claimed in claim 35, wherein said first device comprises a server computer.

37. The method as claimed in claim 35, wherein said first device comprises a mobile server computer.

38. The method as claimed in claim 35, wherein said second device comprises a mobile terminal.

39. A non-transitory machine-readable storage medium having instructions stored thereon which, when executed by a machine, cause the machine to perform operations comprising:
operating in a mobile communication system that has a scheduled time to open a scheduled connection with the machine for transmitting non-key data to the machine;
determining whether to request one or more keys for decrypting content previously stored in the machine;
requesting delivery of said one or more keys; and
receiving said one or more keys attached to a non-key data message during the scheduled connection for transmitting the non-key data.

40. A non-transitory machine-readable storage medium having instructions stored thereon which, when executed by a machine, cause the machine to perform operations including:
scheduling a time to open a scheduled connection with a mobile device for transmitting non-key data to the mobile device;
receiving a request from the mobile device to transmit one or more keys for decrypting content previously stored in the mobile device;
generating said one or more keys to be sent to the mobile device;
attaching said one or more keys to a non-key data message; and transmitting said one or more keys to the mobile device during the scheduled connection for transmitting the non-key data.

\* \* \* \* \*